US012361129B2

United States Patent
Nataraj et al.

(10) Patent No.: US 12,361,129 B2
(45) Date of Patent: *Jul. 15, 2025

(54) MALWARE CLASSIFICATION AND DETECTION USING AUDIO AND IMAGE DESCRIPTORS

(71) Applicant: Mayachitra, Inc., Santa Barbara, CA (US)

(72) Inventors: Lakshmanan Nataraj, Chennai (IN); Bangalore S. Manjunath, Santa Barbara, CA (US); Shivkumar Chandrasekaran, Santa Barbara, CA (US)

(73) Assignee: Mayachitra, Inc., Santa Barbara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/557,781

(22) Filed: Dec. 21, 2021

(65) Prior Publication Data

US 2022/0114256 A1 Apr. 14, 2022

Related U.S. Application Data

(63) Continuation of application No. 16/207,586, filed on Dec. 3, 2018, now Pat. No. 11,244,050.

(51) Int. Cl.
*G06F 21/56* (2013.01)
*G06F 21/57* (2013.01)
(Continued)

(52) U.S. Cl.
CPC ............ *G06F 21/565* (2013.01); *G06F 21/57* (2013.01); *G06N 20/00* (2019.01); *G06F 21/55* (2013.01);
(Continued)

(58) Field of Classification Search
CPC .... G06F 21/565; G06F 21/562; G06F 21/564; G06F 21/566; G06F 21/57; G06F 21/55;
(Continued)

(56) References Cited

U.S. PATENT DOCUMENTS 6,990,443 B1  1/2006  Abe et al.
8,250,655 B1  8/2012  Malanov et al.
(Continued)

FOREIGN PATENT DOCUMENTS

AU  2004300958 A1  *  3/2006  ......... G06F 13/4072
CN    104350775 A  *  2/2015  ......... G06F 11/0742
(Continued)

OTHER PUBLICATIONS

Yao Wang, Jing An, and Wei Huang; (Using CNN-based Representation Learning Method for Malicious Traffic Identification); IEEE Computer Society; Jun. 6-8, 2018.*
(Continued)

*Primary Examiner* — Ali H. Cheema
(74) *Attorney, Agent, or Firm* — Schwegman Lundberg & Woessner, P.A.

(57) ABSTRACT

Methods, systems and computer programs are presented for classifying malware using audio and image signal processing. One method includes an operation for converting a software application to an audio signal and an image signal. Audio features are extracted from the audio signal and image features are extracted from the image signal and are used to classify the software application.

18 Claims, 10 Drawing Sheets

(51) Int. Cl.
  *G06N 20/00* (2019.01)
  *G06F 21/55* (2013.01)
  *H04L 67/55* (2022.01)
(52) U.S. Cl.
  CPC ............ *G06F 21/56* (2013.01); *G06F 21/562* (2013.01); *G06F 21/564* (2013.01); *G06F 21/566* (2013.01); *G06F 2221/034* (2013.01); *H04L 67/55* (2022.05)
(58) Field of Classification Search
  CPC .. G06F 2221/034; G06N 20/00; G06N 20/10; G06N 3/08; G06N 7/01; H04L 67/55
  See application file for complete search history.

(56) References Cited

U.S. PATENT DOCUMENTS

| | | | |
|---|---|---|---|
| 8,321,910 B1* | 11/2012 | English | G06F 16/1734 726/2 |
| 8,510,829 B2 | 8/2013 | Mohandas et al. | |
| 10,616,252 B2 | 4/2020 | Mclane et al. | |
| 10,694,106 B2* | 6/2020 | John Archibald | H04N 7/18 |
| 2011/0154495 A1 | 6/2011 | Stranne | |
| 2012/0210423 A1 | 8/2012 | Friedrichs et al. | |
| 2012/0253805 A1 | 10/2012 | Rajakumar et al. | |
| 2013/0139261 A1 | 5/2013 | Friedrichs et al. | |
| 2013/0326625 A1 | 12/2013 | Anderson et al. | |
| 2013/0333033 A1 | 12/2013 | Khesin | |
| 2014/0090061 A1 | 3/2014 | Avasarala et al. | |
| 2014/0201771 A1* | 7/2014 | Yang | H04N 21/84 725/19 |
| 2015/0070148 A1* | 3/2015 | Cruz-Hernandez | G06F 3/016 340/407.1 |
| 2015/0106931 A1 | 4/2015 | Mankin et al. | |
| 2016/0098561 A1 | 4/2016 | Keller et al. | |
| 2016/0335435 A1 | 11/2016 | Schmidtler et al. | |
| 2017/0040028 A1 | 2/2017 | Seligmann et al. | |
| 2017/0063471 A1 | 3/2017 | Chen | |
| 2017/0110130 A1* | 4/2017 | Sharifi | G10L 15/1815 |
| 2017/0162010 A1* | 6/2017 | Cruz-Hernandez | G10L 15/26 |
| 2017/0262633 A1 | 9/2017 | Miserendino et al. | |
| 2017/0287495 A1 | 10/2017 | Tada et al. | |
| 2018/0183815 A1* | 6/2018 | Enfinger | H04L 63/145 |
| 2018/0191711 A1 | 7/2018 | Bhaya et al. | |
| 2018/0204111 A1* | 7/2018 | Zadeh | G06V 10/764 |
| 2018/0285067 A1 | 10/2018 | Kawakita et al. | |
| 2018/0357542 A1* | 12/2018 | Wu | G06N 3/04 |
| 2019/0108332 A1 | 4/2019 | Glew et al. | |
| 2019/0132334 A1* | 5/2019 | Johns | G06F 21/562 |
| 2019/0138722 A1 | 5/2019 | Krcál et al. | |
| 2019/0253441 A1 | 8/2019 | Horstmeyer et al. | |
| 2019/0362022 A1* | 11/2019 | Haukioja | G10L 15/04 |
| 2020/0042701 A1 | 2/2020 | Yang | |
| 2020/0042704 A1 | 2/2020 | Haim et al. | |
| 2020/0089882 A1 | 3/2020 | Menahem et al. | |
| 2020/0175164 A1 | 6/2020 | Nataraj et al. | |
| 2020/0257957 A1* | 8/2020 | Tse | G06N 3/04 |

FOREIGN PATENT DOCUMENTS

| | | | | |
|---|---|---|---|---|
| CN | 108846340 A | * | 11/2018 | |
| CN | 109510907 A | * | 3/2019 | ............ H04M 19/04 |
| CN | 111386531 A | * | 7/2020 | |
| JP | 2008026292 A | * | 2/2008 | |
| JP | 2021504864 A | * | 2/2021 | ............. G06N 3/048 |
| WO | WO-2019085331 A1 | * | 5/2019 | ......... G06K 9/00302 |

OTHER PUBLICATIONS

Farnoush Manavi and Ali Hamzeh; (A New Method for Malware Detection Using Opcode Visualization); Artificial Intelligence and Signal Processing Conference (AISP); (Year: 2017).*

Mehrdad Farrokhmanesh, and Ali Hamzeh; (A Novel Method for Malware Detection Using Audio Signal Processing Techniques); IEEE (Year: 2016).*

Lakshmanan Nataraj; (A Signal Processing Approach to Malware Analysis); Dec. 2015.*

Lakshmanan Nataraj; (A Signal Processing Approach to Malware Analysis); pp. 166; Published on: Dec. 2015.*

Xiaoqing Yu, Jing Zhang, Junwei Liu, Wanggen Wan, and Wei Yang; (An Audio Retrieval Method Based on Chromagram and Distance Metrics); pp. 4; Published on IEEE (Year: 2010).*

Lakshmanan Nataraj and B.S. Manjunath; (SPAM: Signal Processing to Analyze Malware); pp. 7; Date of publication: Mar. 7, 2016.*

Theodoros Giannakopoulos; (pyAudioAnalysis: An Open-Source Python Library for Audio Signal Analysis); pp. 17; Published: Dec. 11, 2015.*

L. Nataraj, S. Karthikeyan, G. Jacob and B.S.Manjunath (Malware Images: Visualization and Automatic Classification); pp. 7; Published on Jul. 20, 2011.*

"A Signal Processing Approach to Malware Analysis", A dissertation submitted in partial satisfaction of the requirements for the degree Doctor of Philosophy in Electrical and Computer Engineering, (Dec. 2015), 166 pgs.

"U.S. Appl. No. 16/207,586, Advisory Action mailed Mar. 30, 2021", 5 pgs.

"U.S. Appl. No. 16/207,586, Examiner Interview Summary mailed Mar. 10, 2021", 2 pgs.

"U.S. Appl. No. 16/207,586, Examiner Interview Summary mailed Aug. 2, 2021", 3 pgs.

"U.S. Appl. No. 16/207,586, Examiner Interview Summary mailed Oct. 22, 2020", 3 pgs.

"U.S. Appl. No. 16/207,586, Final Office Action mailed Feb. 3, 2021", 18 pgs.

"U.S. Appl. No. 16/207,586, Non Final Office Action mailed Jun. 16, 2021", 28 pgs.

"U.S. Appl. No. 16/207,586, Non Final Office Action mailed Aug. 28, 2020", 18 pgs.

"U.S. Appl. No. 16/207,586, Notice of Allowance mailed Sep. 22, 2021", 21 pgs.

"U.S. Appl. No. 16/207,586, Response filed Mar. 12, 2021 to Final Office Action mailed Feb. 3, 2021", 8 pgs.

"U.S. Appl. No. 16/207,586, Response filed Apr. 5, 2021 to Advisory Action mailed Mar. 30, 2021", 9 pgs.

"U.S. Appl. No. 16/207,586, Response filed Aug. 5, 2021 to Non Final Office Action mailed Jun. 16, 2021", 9 pgs.

"U.S. Appl. No. 16/207,586, Response filed Oct. 27, 2020 to Non Final Office Action mailed Aug. 28, 2020", 10 pgs.

Fahmeeda, Sayyada, et al., "Audio Data Security and Feature Extraction over Cloud", Intl. Journal of Computer Applications, 168(10), (Jun. 2017), 5 pgs.

Farnoush, Manavi, et al., "A New Method for Malware Detection Using Opcode Visualization", IEEE, (2017), 7 pgs.

Farrokhmanesh, Mehrdad, et al., "A Novel Method for Malware Detection Using Audio Signal Processing Techniques", 2016 Artificial Intelligence and Robotics (IRANOPEN), (2016), 7 pgs.

Giannakopoulos, Theodoras, "pyAudioAnalysis: An Open-Source Python Library for Audio Signal Analysis", (Dec. 11), 17 pgs.

Hashem, Hashemi, et al., "Visual malware detection using local malicious pattern", (Jun. 8, 2017), 14 pgs.

Mitra, Urbashi, et al., "Detecting and Identifying Malware: A New Signal Processing Goal", IEEE Signal Processing Magazine, (Sep. 2006), 5 pgs.

Nataraj, Lakshmanan, et al., "A Comparative Assessment of Malware Classification cusing Binary Texture Analysis and Dynamic Analysis", Workshop on Artificial Intelligence and Security (AISec), Chicago, Oct. 2011., (2011), 10 pgs.

Nataraj, Lakshmanan, et al., "SARVAM: Search And RetrieVAI of Malware", nnual Computer Security Applications Conference (ACSAC) Workshop on Next Generation Malware Attacks and Defense (NGMAD), New Orleans, Dec. 2013., (2013), 9 pgs.

Nataraj, Lakshmanan, et al., "SATTVA: SpArsiTy inspired classificaTion of malware", ACM Workshop on Information Hiding and Multimedia Security (IH and MMSEC), Portland, Oregon, Jun. 2015., (2015), 6 pgs.

(56) References Cited

OTHER PUBLICATIONS

Nataraj, Lakshmanan, et al., "SPAM: Signal Processing to Analyze Malware", Cornell University Library, (2016), 6 pgs.

Ping, Matthew, "On the Effectiveness of Application Characteristics in the Automatic Classification of Malware on Smartphones", Bander Alsulami and Spiros Mancoridis (Drexel University, Philadelphia, PA), (2016), 8 pgs.

Saeid, Safavi, et al., "Fraud Detection in Voice-Based Identity Authentication Applications and Services", (Dec. 2016), 9 pgs.

Shazhad, Raja Khurram, et al., "Detection of Spyware by Mining Executable Files", (2010), 8 pgs.

Wang, Pang-Chieh, et al., "A Practical Approach to Manage Applications and Prevent Malware Spreading in Mobile Environment", IEEE 3rd Global Conference on Consumer Electronics, (2014), 2 pgs.

Zeisberger, Sascha, et al., "A Framework for the Static Analysis of Malware focusing on Signal Processing Techniques", (2012), 2 pgs.

\* cited by examiner

MALWARE CLASSIFICATION AND DETECTION USING AUDIO AND IMAGE DESCRIPTORS

PRIORITY

This application is a continuation of U.S. patent application Ser. No. 16/207,586, filed Dec. 3, 2018, which is incorporated by reference herein in its entirety.

TECHNICAL FIELD

Embodiments of the present disclosure relate generally to malware classification and detection. More particularly, but not by way of limitation, the present disclosure addresses systems and method for classifying and detecting malware using audio signals.

BACKGROUND

Cyber-attacks are increasing and malware has quickly expanded to newer platforms as hackers try to evade traditional computer security mechanisms. The number of malware is also rising due to malware mutation, which is the process of creating new malware from existing malware. Malware variants are often created by reusing or modifying parts of a malware code. Malware authors change minor aspects of the original source code to produce a new variant.

Malware—malicious software, is any software that is designed to cause damage to a computer, server, network, mobile phones and other devices. Based on their specific function, malware can be classified into different types. Malware can further be classified into families which in turn have many variants that perform almost the same function. Malware variants are created either by making changes to the malware code or by using executable packers.

In the former case a simple mutation occurs by changing portions of the code. These are referred to as unpacked malware variants. In the latter case a more complex mutation occurs either by compressing or encrypting the main body of the code and appending a decompression or decryption routine, which during runtime decompresses/decrypts the encrypted payload.

The new variants are referred to as packed malware variants and perform the same function as the original malware but their attributes are so different that Antivirus software, which uses traditional signature-based detection, are not able to detect them. The tools used for obfuscation are called executable packers, available both as freeware and commercial tools. There are hundreds of packers that exist today which make it very easy for malware writers to create new variants.

An objective of a malware detection system is to determine if an unknown digital file is malicious.

BRIEF SUMMARY

Solutions presented herein analyze audio or image signal representations of malware code to classify the code as malware, benign or unknown. A malware binary is read as a one dimensional signal of 8-bit unsigned integers, where every entry is a byte value of the malware. A classification is made of the audio signal based on audio descriptors computed on the signal. The classification is then used to determine whether the code is malware, benign or unknown.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example methods, systems, and computer programs are directed to a malware detection system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
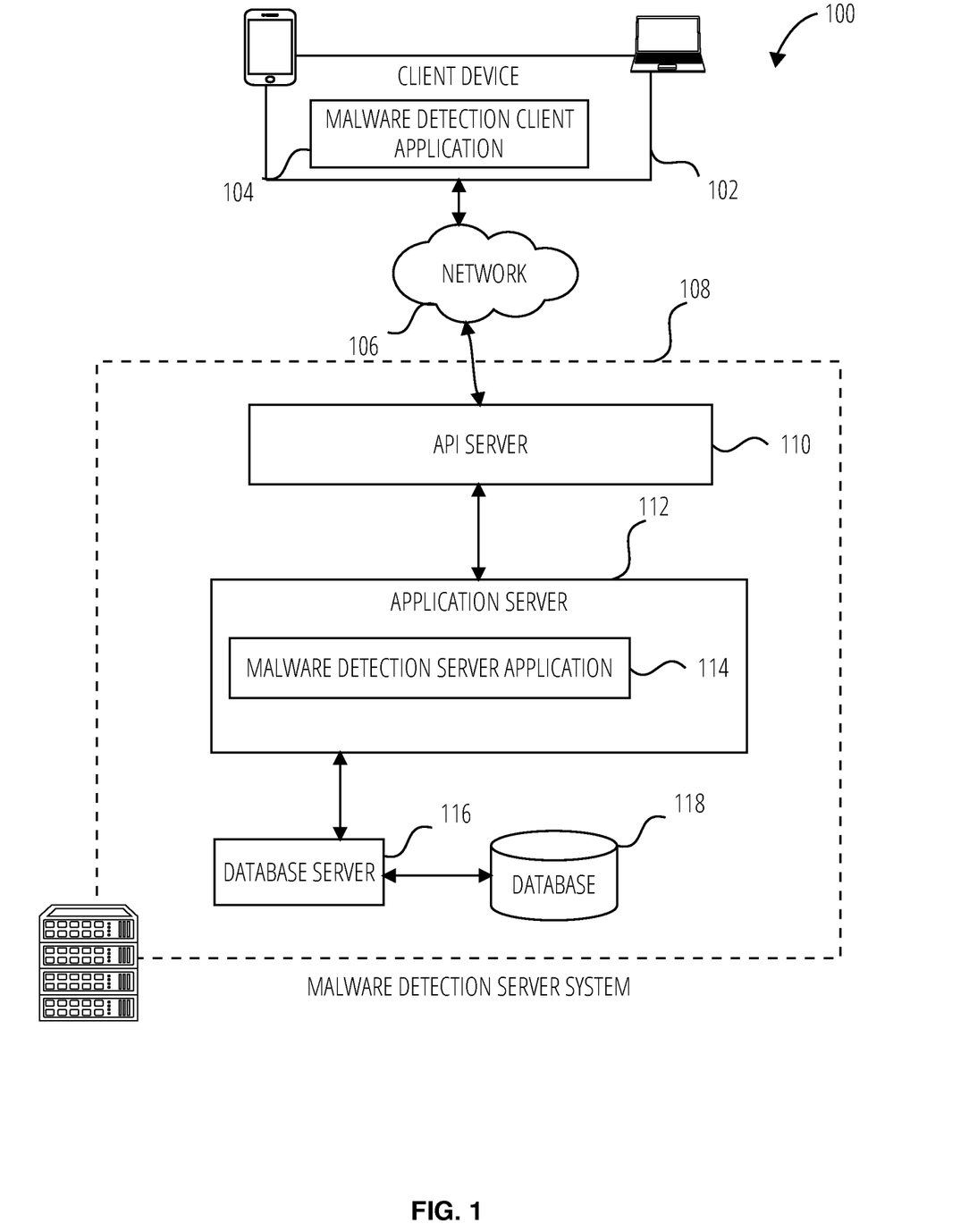
FIG. 1 is a block diagram showing an example malware detection system over a network.

FIG. 1 is a block diagram showing an example malware detection system 100 for processing data (e.g., documents and associated content) over a network. The malware detection system 100 includes multiple client devices 102, each of which hosts a number of applications including a malware detection client application 104. Each malware detection client application 104 is communicatively coupled to a malware detection server system 108 via a network 106 (e.g., the Internet).

Accordingly, each malware detection client application 104 is able to communicate and exchange data with the malware detection server system 108 via the network 106. The data exchanged between messaging client applications 104, and between a malware detection client application 104 and the malware detection server system 108, includes functions (e.g., commands to invoke functions) as well as payload data (e.g., text, audio, video or other multimedia data).

The malware detection server system 108 provides server-side functionality via the network 106 to a particular malware detection client application 104. While certain functions of the malware detection system 100 are described herein as being performed by either a malware detection client application 104 or by the malware detection server system 108, it will be appreciated that the location of certain functionality either within the malware detection client application 104 or the malware detection server system 108 is a design choice. For example, it may be technically preferable to initially deploy certain technology and functionality within the malware detection server system 108, but to later migrate this technology and functionality to the malware detection client application 104 where a client device 102 has a sufficient processing capacity.

The malware detection server system 108 supports various services and operations that are provided to the malware detection client application 104. Such operations include transmitting data to, receiving data from, and processing data generated by the malware detection client application 104. This data may include, document content, client device information, and geolocation information, as examples. Data exchanges within the malware detection system 100 are invoked and controlled through functions available via user interfaces (UIs) of the malware detection client application 104.

Turning now specifically to the malware detection server system 108, an Application Program Interface (API) server 110 is coupled to, and provides a programmatic interface to, an application server 112. The application server 112 is communicatively coupled to a database server 116, which facilitates access to a database 118 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the malware detection client application 104 in order to invoke functionality of the application server 112. The Application Program Interface (API) server 110 exposes various functions supported by the application server 112 to the malware detection server application 114.

The application server 112 hosts a number of applications and subsystems, including a malware detection server application 114. The malware detection server application 114 implements a number of data processing technologies and functions, particularly related to the processing of content (e.g., textual and multimedia content) included in documents received from the malware detection client application 104. Other processor and memory intensive processing of data may also be performed server-side by the malware detection server application 114, in view of the hardware requirements for such processing.

The application server 112 is communicatively coupled to a database server 116, which facilitates access to a database 118 in which is stored data associated with precomputed descriptors processed by the malware detection server application 114.

Figure 2:
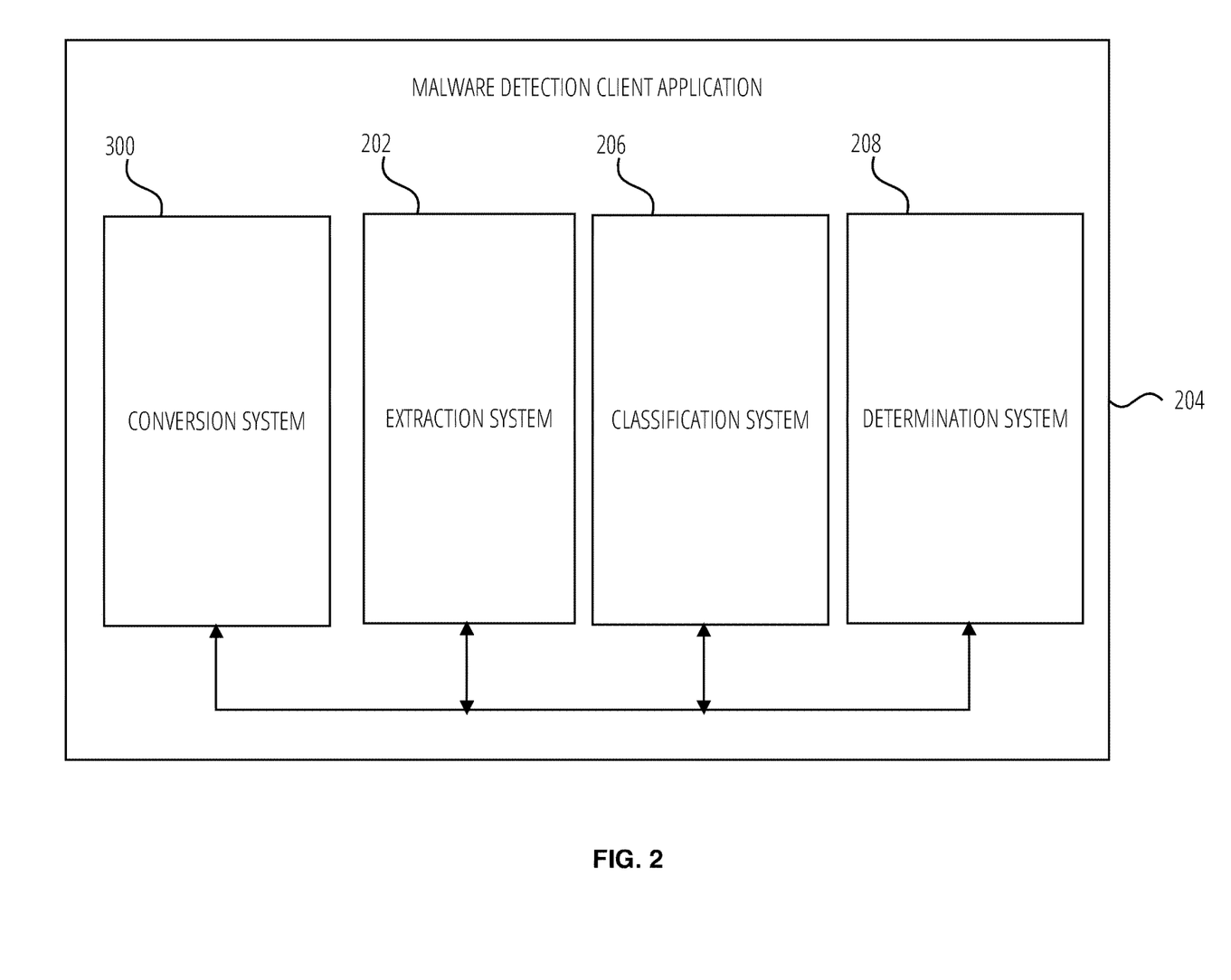
FIG. 2 is block diagram illustrating further details regarding a malware detection system, according to example embodiments.

FIG. 2 is block diagram illustrating further details regarding the malware detection system 100, according to example embodiments. Specifically, the malware detection system 100 is shown to comprise the malware detection client application 204 and the application server 112, which in turn embody a number of some subsystems, namely a conversion system 300, an extraction system 202, a classification system 206, and a determination system 208.

The conversion system 300 is responsible for converting the documents received at the client device 102 from an executable file to a signal representation. The signal representation may be an audio signal, an image signal or a combination of audio and image signals.

The extraction system 202 is responsible for extracting audio features, image features, or a combination of audio and image features from the signal representation of the executable file.

The classification system 206 is responsible for using the audio features, image features or a combination of fused audio and image features to determine if the executable file is malicious, benign or unknown. The classification system 206 may utilize various machine learning techniques to determine if the executable file is malicious, benign or unknown.

The determination system 208 is responsible for communicating to the client device 102 that the received executable file is malware.

Figure 3:
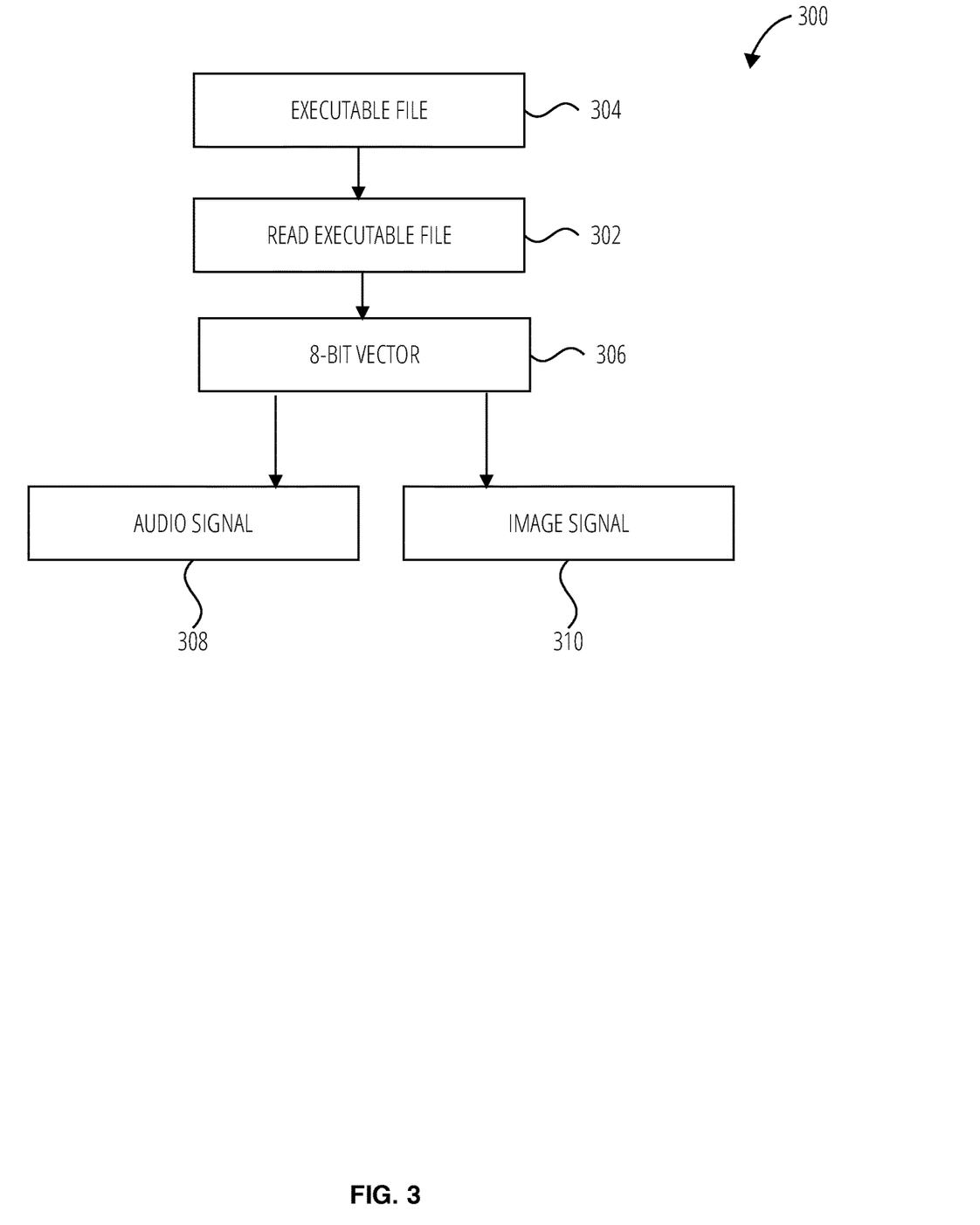
FIG. 3 is a flow diagram describing representations of an executable file as an audio signal or image signal, according to example embodiments.

FIG. 3 is flow diagram describing the conversion system 300, according to example embodiments. A malware binary is read as a one dimensional signal of 8-bit unsigned integers, where each entry is a byte value of the malware. In some example embodiments, the conversion system 300 may retrieve the executable file 304 from the client device 102. The conversion system 300 may at step 302 read the executable file, byte by byte. The conversion system 300 may compute the byte value for every byte in the range of 0-255 and may convert the executable file to an 8-bit vector 306. In some example embodiments, the conversion system 300 may represent the byte values as an audio signal 308 or represent the byte values as an image signal 310 or represent the byte values as both an audio signal and an image signal. The system may divide the audio signal into non-overlapping windows and save the signal as a wave file using audio processing libraries at a specified frequency.

Figure 4:
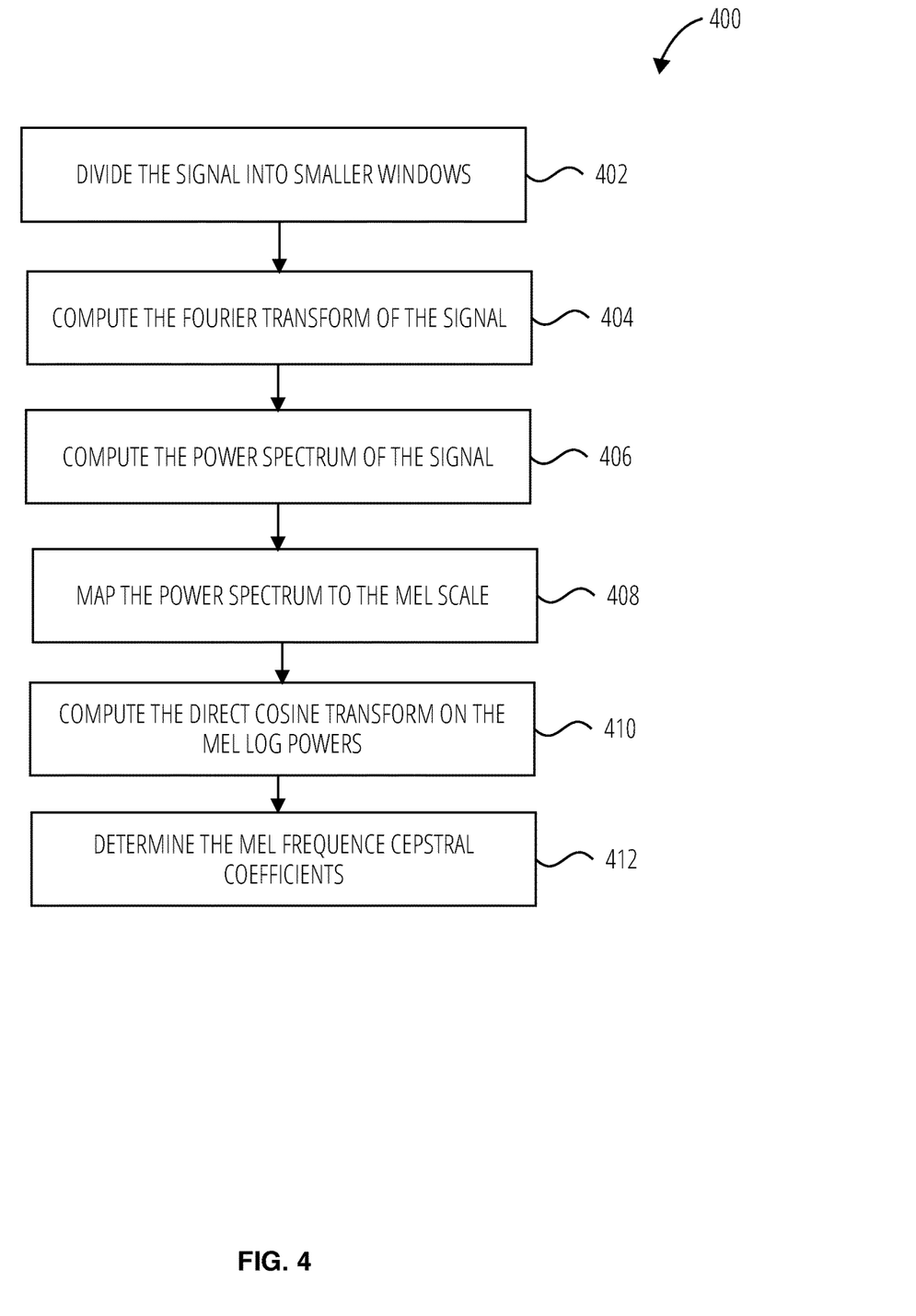
FIG. 4 is a flow diagram describing audio feature extraction, according to example embodiments.

FIG. 4 is a flow diagram describing a method 400 for mel frequency cepstral coefficients (MFCC) computation. Audio descriptors are effective in distinguishing malware from benign files. MFCC are common features used in speech recognition, music information retrieval and audio compression. The coefficients are computed from the mel-frequency cepstrum of an audio signal. These frequency bands are known to better approximate the human auditory system's response than linearly 2 spaced frequency bands. The steps involved in MFCC computation require a system to, divide the signal into smaller windows 402, compute the Fourier transform of the signal 404, compute the power spectrum of the signal 406, map the power spectrum to the mel scale 408, compute the direct cosine transform on the mel log powers 410 and determine the mel frequency cepstral coefficients 412. In an example embodiment, the extraction system 202 computes MFCC features. In some example embodiments, various audio and image features may also be computed on a signal including GIST descriptors, N-grams of byte codes, Assembly Language Instruction count, pehash and ssdeep.

In an example embodiment, the extraction system 202 computes audio and image features on only a first portion of the signal and ignores a second portion of the signal.

Figure 5:
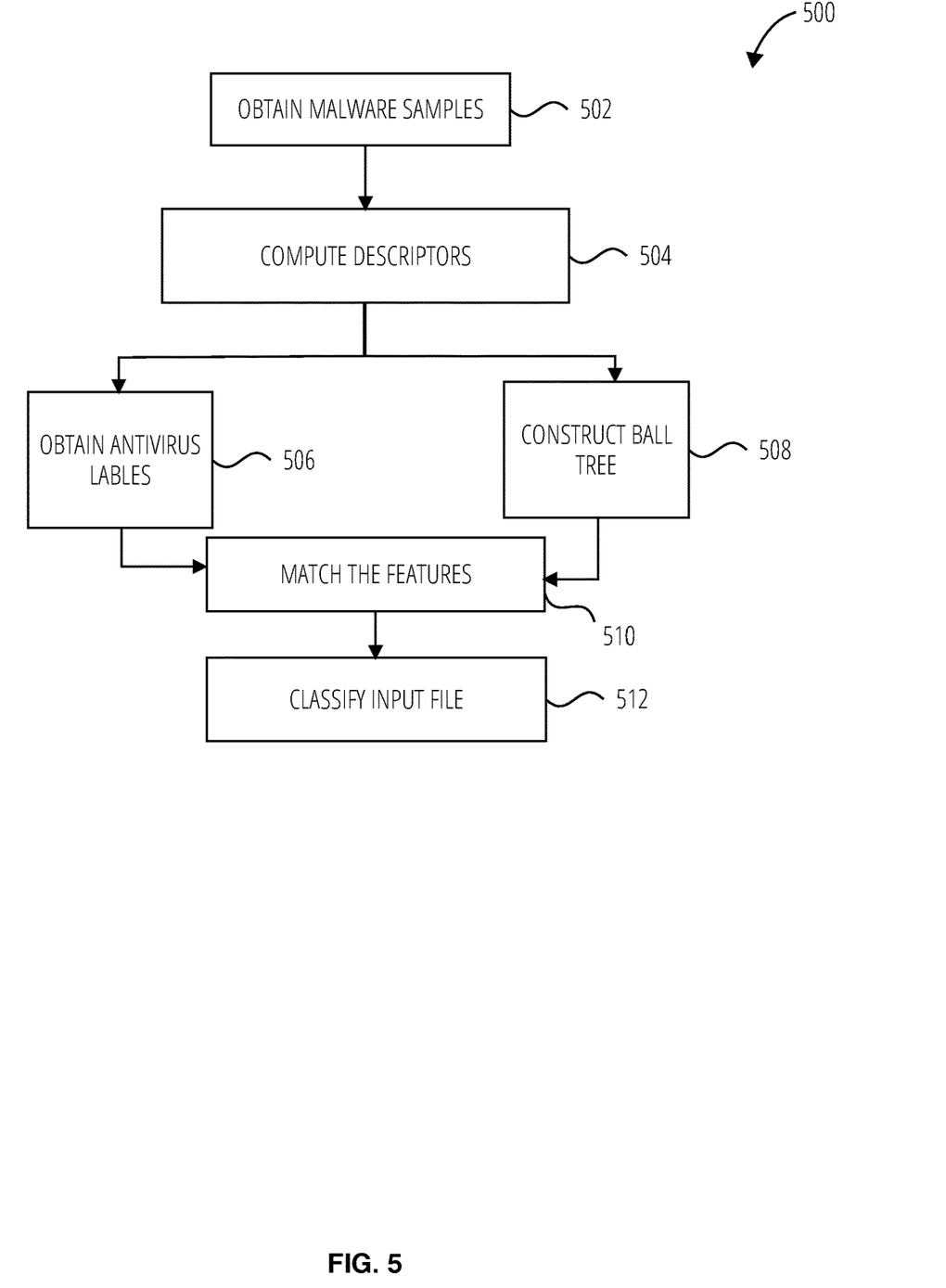
FIG. 5 is a flow diagram depicting example operations for classifying malware, according to example embodiments.

FIG. 5 is a flow diagram describing a method 500 for performing the nearest neighbor based descriptor matching.

The nearest neighbor method is based on the shortest distance between descriptors. In an example embodiment, the classification system 206 at operation 502, obtains a large corpus of malware samples from various sources. At operation 504, the classification system 206 computes the descriptors of the obtain malware samples 502. The high dimensionality of the descriptors often makes searching for the nearest descriptor slow. Thus, in order to perform the nearest neighbor search quickly, in an example embodiment, the classification system 206 may at operation 508, construct a ball tree.

Simultaneously, the classification system 206 may obtain antivirus labels 506 of the obtain malware samples 502. In some example embodiments, the antivirus labels may be retrieved from Virustotal, for example. The antivirus labels act as a ground truth and are later used to describe the nature of the sample (i.e. malicious, benign or unknown). During the query phase, the descriptor for the new sample is computed and classification system 206 may compare the features 510 computed from the obtain malware samples 502 to the precomputed descriptors in the database 118 to retrieve the top matches. Based on the nature of the top matches and nearest neighbor distance from the query, the classification system 206 may at operation 512, classify the input file.

Figure 6:
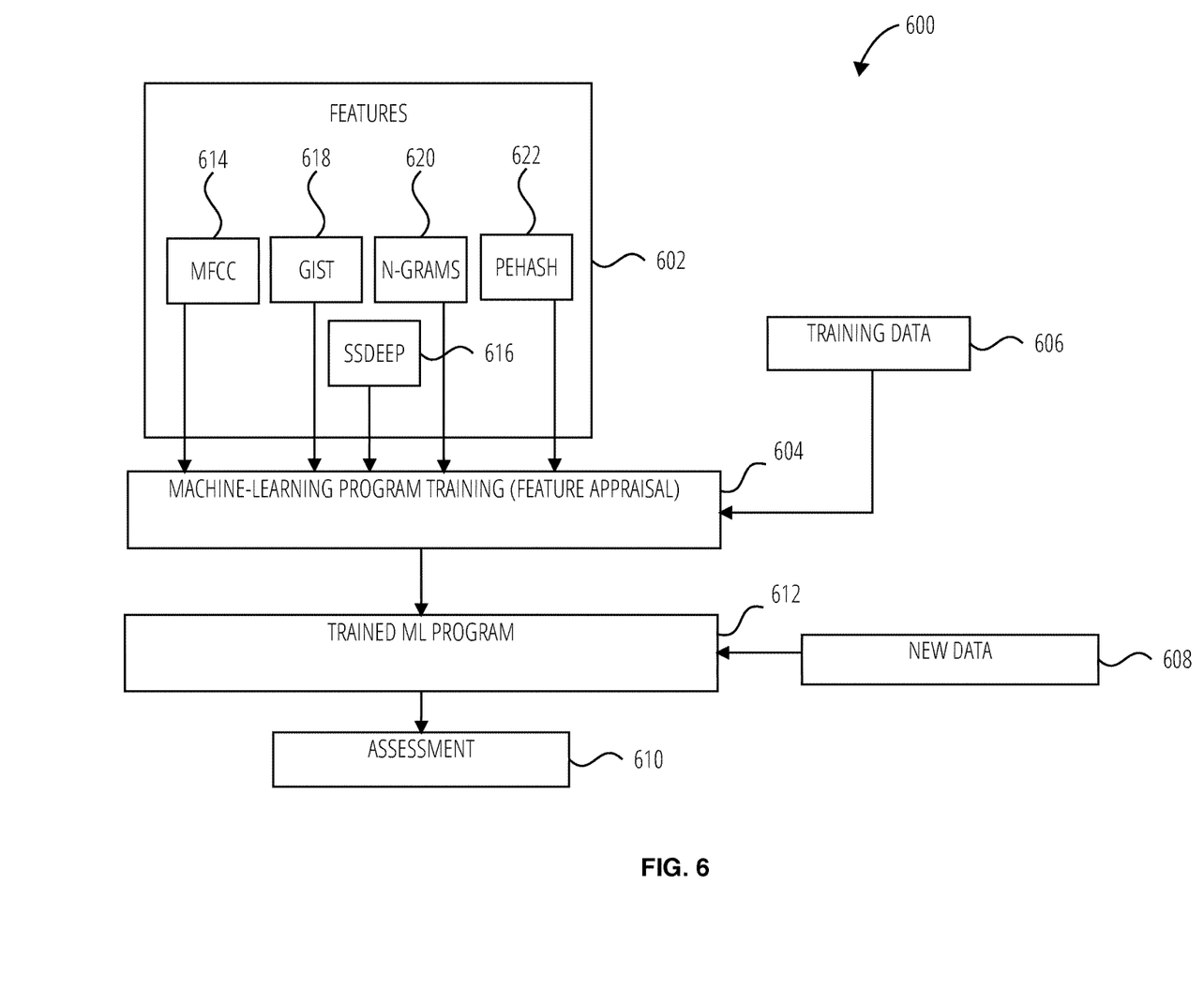
FIG. 6 is a block diagram illustrating an example of a machine upon or by which one or more example process embodiments described herein may be implemented or controlled.

FIG. 6 illustrates the training and use of a machine-learning program 600, according to some example embodiments. In some example embodiments, machine-learning programs (MLPs), also referred to as machine-learning algorithms or tools, are utilized to perform operations associated with malware classification. Machine learning is a field of study that gives computers the ability to learn without being explicitly programmed. Machine learning explores the study and construction of algorithms, also referred to herein as tools that may learn from existing data and make predictions about new data. Such machine-learning tools operate by building a model from example training data 606 in order to make data-driven predictions or decisions expressed as outputs or assessment 610. Although example embodiments are presented with respect to a few machine-learning tools, the principles presented herein may be applied to other machine-learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a prediction probability to classify an input file as malicious, benign, or unknown. The machine-learning algorithms utilize the training data 606 to find correlations among identified features 602 that affect the outcome.

The machine-learning algorithms utilize features 602 for analyzing the data to generate an assessment 610. The features 602 are an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 602 may be of different types and may include one or more of mfcc 614, gist 618, n-grams 620, pehash 622 and ssdeep 616.

The machine-learning algorithms utilize the training data 606 to find correlations among the identified features 602 that affect the outcome or assessment 610. In some example embodiments, the training data 606 includes labeled data, which is known data for one or more identified features 602 and one or more outcomes, such as detecting malware.

With the training data 606 and the identified features 602, the machine learning tool is trained at operation 704. The machine-learning tool appraises the value of the features 602 as they correlate to the training data 606. The result of the training is the trained machine-learning program 712.

When the machine learning program 612 is used to perform an assessment, new data 608 is provided as an input to the trained machine-learning 612, and the machine-learning program 612 generates the assessment 610 as output. For example, when an executable file is converted to an audio signal, the machine-learning program utilizes audio features to determine if the file is malicious, benign or unknown.

Figure 7:
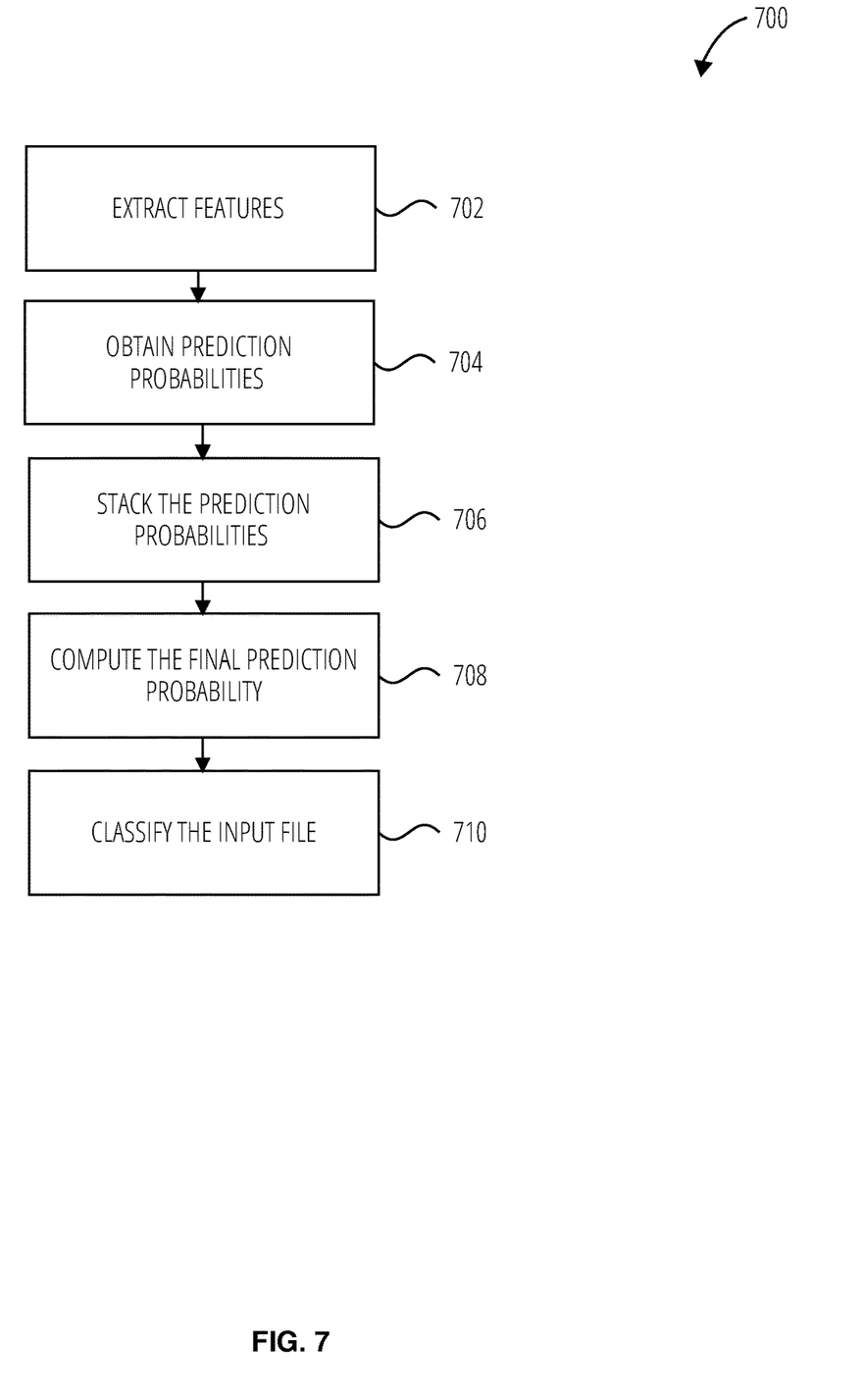
FIG. 7 is a flow diagram illustrating example operations for stacked generalization, according to example embodiments.

Turning now to FIG. 7, FIG. 7 is a flow diagram describing a method 700 for performing stacked generalization for malware classification. Stacked generalization is a meta-learning technique that stacks the prediction outputs from the base level to form a new feature vector, which is then fed to a meta-learner. Meta-learning involves a two-staged classification framework. In the first stage, a dataset is divided into disjoints sets or folds. At every iteration, one fold is treated as the testing set and other folds are treated as the training set. Features are extracted and passed through one or many classifiers. These are called base (level-0) features and classifiers. The output of the first stage is prediction labels or probabilities. In the second stage, a meta (level-1) learner uses the outputs from the first stage to boost the prediction accuracy. In an example embodiment, the classification system 206 divides the data into k folds, with k−1 folds being the training and k-th fold being the testing set. The classification system 206 may extract features at operation 702 from the input file and using a base classifier, obtain prediction probabilities at operation 704 for each feature of the testing set. The previous steps are repeated by varying the testing set and training set for different folds. The classification system 206 may then stack the prediction probabilities 706 of each feature to form the meta feature. The classification system 206 may compute the final prediction probability 708 by using the meta-features on the meta-classifier. Based on the final prediction probability, the classification system 206 may classify the file as malicious, benign or unknown.

In some example embodiments the features extracted at operation 702 may include one or more of MFCC, gist, n-grams, pehash, and ssdeep.

In some example embodiments, the features extracted at operation 702 are a combination of image features and audio features.

Figure 8:
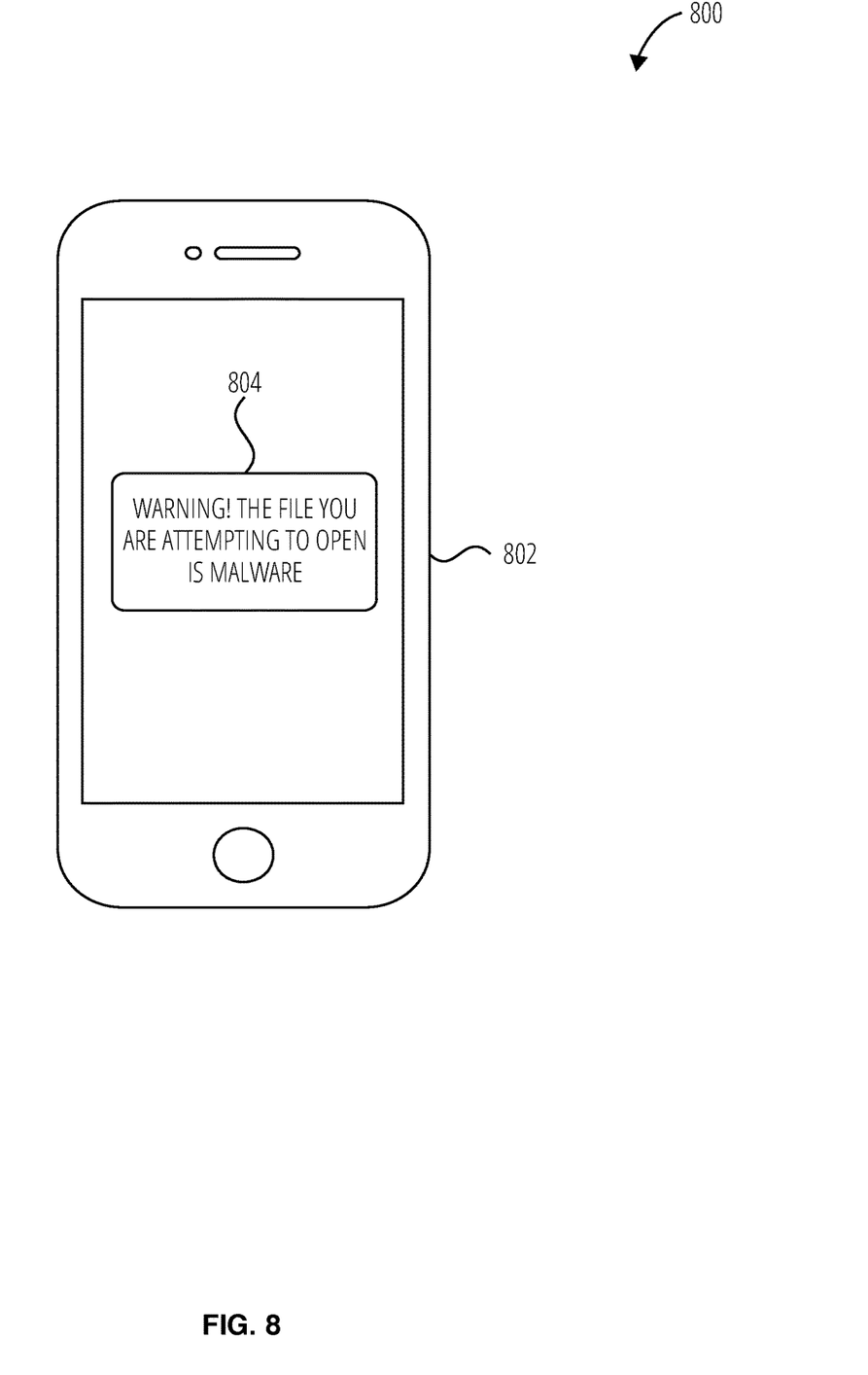
FIG. 8 is an illustration of an example client notification, according to example embodiments.

FIG. 8 is an illustration 800 of a notification that may be presented on a client device by the determination system 208. In an example embodiment, if the determination system 208 determines that the executable file is malicious, a notification may be presented as a user interface element on a GUI. The user interface element is configurable and may allow the user to allow selection of the element to delete the file, open the file, move the file or do nothing. The notification may also present to the user that the file type is unknown and may display a warning to the user to refrain from opening the file. In some example embodiments, the determination system 208 may cause presentation of audio spectrograms. Audio spectrograms of malware variants belonging to the same family may exhibit a visual similarity.

In some example embodiments, if the determination system 208 determines that the executable file is malicious, the determination system 208 may cause modifications to the file. The modifications to the file may include modifications to the file metadata. For example, if the file is malicious or unknown, the determination system 208 may alter access permissions to the file.

Figure 9:
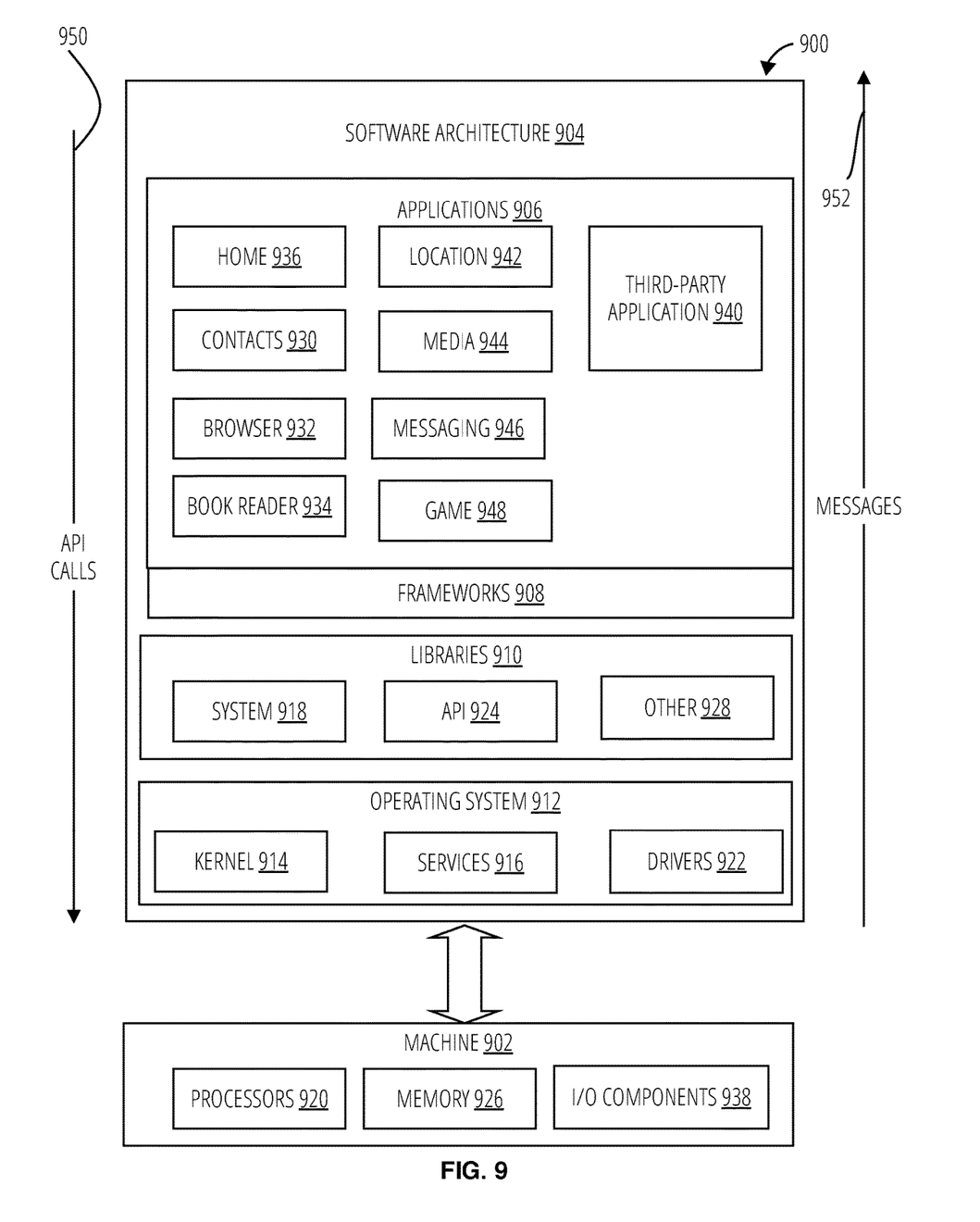
FIG. 9 is a block diagram showing a software architecture within which the present disclosure may be implemented, in accordance with example embodiments.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Figure 10:
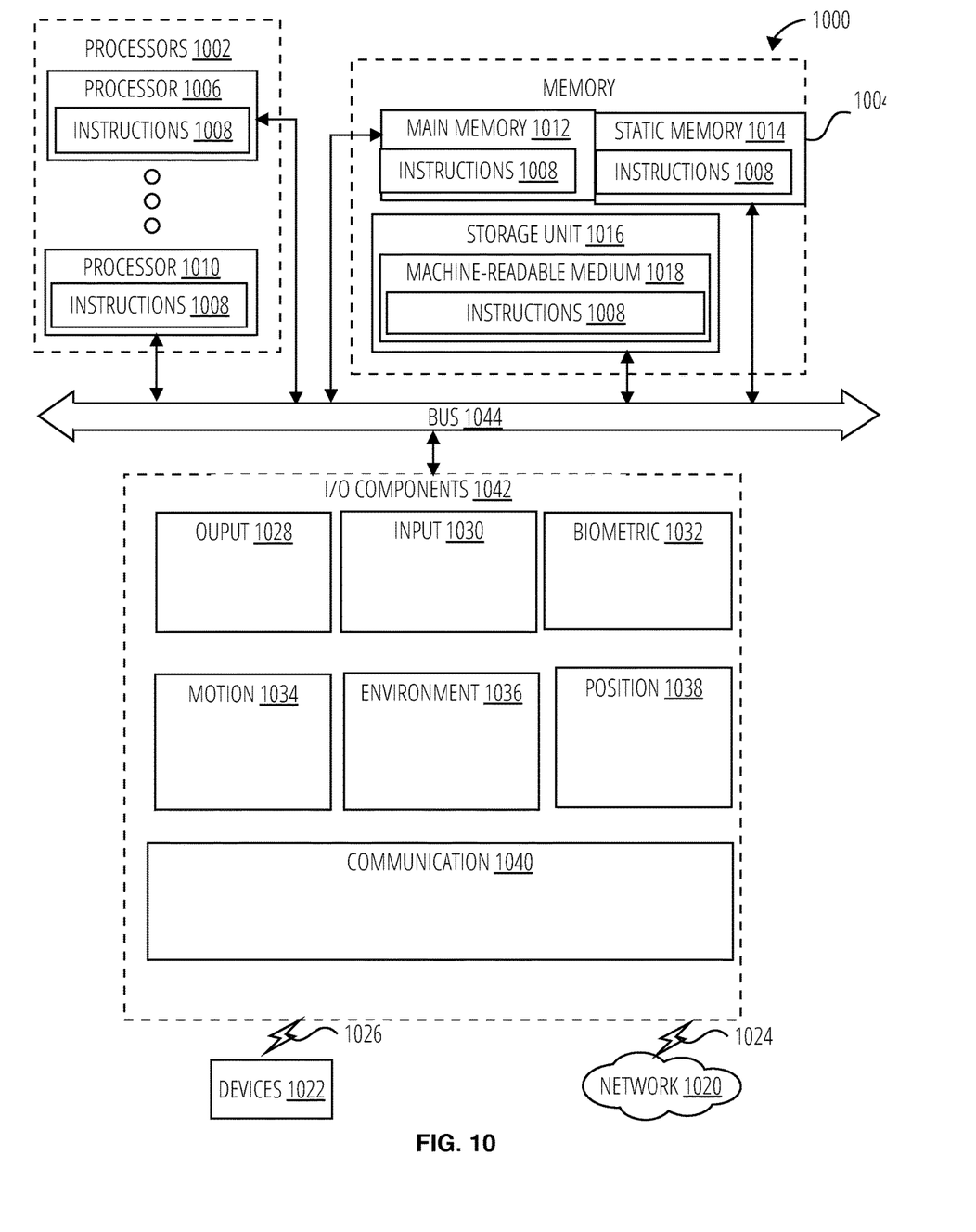
FIG. 10 is a diagrammatic representation of a machine in the form of a computer system within which a set of instructions may be executed for causing the machine to perform any one or more of the methodologies discussed herein, in accordance with some example embodiments.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

Furthermore, the machine-readable medium is a tangible non-transitory machine-readable medium in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional barcodes such as Universal Product Code (UPC) barcode, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
  accessing, using a hardware processor, a software application from a client device, the software application comprising a plurality of bytes;
  processing the software application by computing a set of byte values based on the plurality of bytes;
  based on the set of byte values, converting the software application to an audio file and an image file, the converting comprising:
    representing the set of byte values as an audio signal;
    dividing the audio signal into non-overlapping windows;
    saving the divided audio signal as the audio file at a specified frequency;
    representing the set of byte values as an image signal; and
    saving the image signal as the image file;
  extracting, using the hardware processor, a set of audio features from a first portion of the audio file and ignoring a second portion of the audio file;
  extracting, using the hardware processor, a set of image features from a first portion of the image file and ignoring a second portion of the image file;
  generating a classification for the software application by using a machine learning model that comprises a two-staged classification framework implementing a meta-learning technique, trained to analyze the extracted set of audio features and the extracted set of image features, to classify the software application based on both of the extracted set of audio features and the extracted set of image features;
  based on the classification, determining whether the software application is malware;
  causing presentation of a notification within a graphical user interface of the client device indicating the classification of the software application, the notification comprising a user interface element;
  receiving a selection of the user interface element; and
  in response to receiving the selection, performing at least one of opening the software application from the client device, moving the software application from the client device, or deleting the software application from the client device.

2. The method of claim 1, wherein the image file comprises an image signal.

3. The method of claim 1, wherein the audio file comprises a one-dimensional audio signal and the image file comprises a two-dimensional image signal.

4. The method of claim 1, wherein the machine learning model is trained with prediction probabilities of the set of audio features of the software application.

5. The method of claim 1, further comprising: comparing the extracted set of audio features with a set of precomputed audio descriptors in a database.

6. The method of claim 1, further comprising: based on the classification of the software application, causing display of audio spectrograms on the graphical user interface of the client device.

7. A system comprising:
one or more processors; and
a memory storing instructions, that when executed by the one or more processors, configure the one or more processors to perform operations comprising:
accessing a software application from a client device, the software application comprising a plurality of bytes;
processing the software application by computing a set of byte values based on the plurality of bytes;
based on the set of byte values, converting the software application to an audio file and an image file, the converting comprising:
representing the set of byte values as an audio signal;
dividing the audio signal into non-overlapping windows;
saving the divided audio signal as the audio file at a specified frequency;
representing the set of byte values as an image signal; and saving the image signal as the image file;
extracting a set of audio features from a first portion of the audio file and ignoring a second portion of the audio file;
extracting a set of image features from a first portion of the image file and ignoring a second portion of the image file;
generating a classification for the software application by using a machine learning model that comprises at wo-staged classification framework implementing a meta-learning technique, trained to analyze the extracted set of audio features and the extracted set of image features, to classify the software application based on both of the extracted set of audio features and the extracted set of image features;
based on the classification, determining whether the software application is malware;
causing presentation of a notification within a graphical user interface of the client device indicating the classification of the software application, wherein the notification comprises a user interface element;
receiving a selection of the user interface element; and
in response to receiving the selection, performing at least one of opening the software application from the client device, moving the software application from the client device, or deleting the software application from the client device.

8. The system of claim 7, the operations further comprising: based on the classification of the software application, causing display of audio spectrograms on the graphical user interface of the client device.

9. The system of claim 7, wherein the image file comprises an image signal.

10. The system of claim 7, wherein the audio file comprises a one-dimensional audio signal and the image file comprises a two-dimensional image signal.

11. The system of claim 7, wherein the machine learning model is trained with prediction probabilities of the set of audio features of the software application.

12. The system of claim 7, further comprising: modifying the software application to prevent a user from opening the software application.

13. A non-transitory computer-readable storage medium including instructions that when executed by a computer, cause the computer to perform operations comprising:
accessing a software application from a client device, the software application comprising a plurality of bytes;
processing the software application by computing a set of byte values based on the plurality of bytes;
based on the set of byte values, converting the software application to an audio file and an image file, the converting comprising:
representing the set of byte values as an audio signal;
dividing the audio signal into non-overlapping windows;
saving the divided audio signal as the audio file at a specified frequency;
representing the set of byte values as an image signal; and
saving the image signal as the image file;
extracting a set of audio features from a first portion of the audio file and ignoring a second portion of the audio file;
extracting a set of image features from a first portion of the image file and ignoring a second portion of the image file;
generating a classification for the software application by using a machine learning model that comprises at wo-staged classification framework implementing a meta-learning technique, trained to analyze the extracted set of audio features and the extracted set of image features, to classify the software application based on both of the extracted set of audio features and the extracted set of image features;
based on the classification, determining whether the software application is malware;
causing presentation of a notification within a graphical user interface of the client device indicating the classification of the software application, wherein the notification comprises a user interface element;
receiving a selection of the user interface element; and
in response to receiving the selection, performing at least one of opening the software application from the client device, moving the software application from the client device, or deleting the software application from the client device.

14. The non-transitory computer-readable storage medium of claim 13, the operations further comprising: based on the classification of the software application, causing display of audio spectrograms on the graphical user interface of the client device.

15. The non-transitory computer-readable storage medium of claim 13, wherein the image file comprises an image signal.

16. The non-transitory computer-readable storage medium of claim 13, wherein the audio file comprises a one-dimensional audio signal and the image file comprises a two-dimensional image signal.

17. The non-transitory computer-readable storage medium of claim 13, wherein the machine learning model is trained with prediction probabilities of the set of audio features of the software application.

18. The non-transitory computer-readable storage medium of claim 13, the operations further comprising: comparing the extracted set of audio features with a set of precomputed audio descriptors in a database.

* * * * *